United States Patent
McKevitt et al.

(10) Patent No.: US 7,068,930 B2
(45) Date of Patent: Jun. 27, 2006

(54) CAMERA LENS POSITIONING USING A ELECTRO-ACTIVE DEVICE

(75) Inventors: Gareth McKevitt, Cambridge (GB); Anthony Hooley, Cambridge (GB); James Allan, Suffolk (GB); David Henry Pearce, Birmingham (GB); Ursula Ruth Lenel, Cambridge (GB)

(73) Assignee: 1...Limited, Cambridge (GB)

( * ) Notice: Subject to any disclaimer, the term of this patent is extended or adjusted under 35 U.S.C. 154(b) by 75 days.

(21) Appl. No.: 10/480,664

(22) PCT Filed: Jun. 19, 2002

(86) PCT No.: PCT/GB02/02821

§ 371 (c)(1),
(2), (4) Date: May 28, 2004

(87) PCT Pub. No.: WO02/103451

PCT Pub. Date: Dec. 27, 2002

(65) Prior Publication Data
US 2004/0234257 A1  Nov. 25, 2004

(30) Foreign Application Priority Data
Jun. 20, 2001 (GB) .................................. 0115073.9

(51) Int. Cl.
*G03B 3/10* (2006.01)
(52) U.S. Cl. ............................ 396/79; 396/85; 396/133
(58) Field of Classification Search .................. 396/79, 396/85, 144, 133; 359/696–698, 824; 348/240.3, 348/335, 345
See application file for complete search history.

(56) References Cited

U.S. PATENT DOCUMENTS 3,816,774 A  6/1974  Ohnuki et al.
(Continued)

FOREIGN PATENT DOCUMENTS

DE  19 45 448  3/1971
(Continued)

OTHER PUBLICATIONS

B.L.Jiao & J.D. Zhang; Torsional Modes in Piezo Helical Springs; IEEE Transactions on Ultrasonics, Ferroelectronics, and Frequency Control; vol. 46, No. 1, Jan. 1999.

(Continued)

*Primary Examiner*—W. B. Perkey
(74) *Attorney, Agent, or Firm*—Elman Technology Law, P.C.; Gerry J. Elman (57) ABSTRACT

A camera (30) uses an electro-active device (11) to position a movable lens. The electro-active device (11) comprises an electro-active structure in the form of a continuous electro-active member (12) curving in a helix around a minor axis (13) which is in itself curved for example in a helix around a major axis (14). The continuous member (12) has a bender construction of a plurality of layers (21 and 22) including at least one layer of electro-active material so that it bends, on activation, around the minor axis (13). Concomitantly with the bending, the electro-active structure twists around the minor axis. Concomitantly with that twisting, relative displacement of the ends (16) of the device (11) occurs due to the combination of the twisting around the minor axis (13) and the fact that the minor axis (13) is curved. This structure of the electro-active device (11) is compact and provides for linear displacement, thereby making it suitable for positioning the lens of the camera (30).

20 Claims, 3 Drawing Sheets

U.S. PATENT DOCUMENTS

| | | | |
|---|---|---|---|
| 3,900,748 | A | 8/1975 | Adler |
| 4,291,958 | A | 9/1981 | Frank et al. |
| 4,330,730 | A | 5/1982 | Kurz et al. |
| 4,601,539 | A | 7/1986 | Watanabe |
| 4,638,207 | A | 1/1987 | Radice |
| 4,816,859 | A | 3/1989 | Maruyama et al. |
| 5,440,194 | A | 8/1995 | Beurrier |
| 5,526,601 | A | 6/1996 | Onuma et al. |
| 5,592,250 | A | 1/1997 | Shimizu |
| 6,833,656 | B1 * | 12/2004 | Hooley et al. ............... 310/369 |

FOREIGN PATENT DOCUMENTS

| | | |
|---|---|---|
| EP | 0 251 901 | 1/1988 |
| GB | 2 322 232 | 8/1998 |
| GB | 2 329 514 | 3/1999 |
| JP | 11064096 | 3/1999 |
| WO | WO 98/09339 A1 | 3/1998 |
| WO | WO 98/34434 A1 | 8/1998 |
| WO | WO 99/54626 A1 | 10/1999 |
| WO | WO 01 02896 A | 1/2001 |
| WO | WO 01 02897 A | 1/2001 |
| WO | WO 01/47041 A2 | 6/2001 |

OTHER PUBLICATIONS

Dancila, D.S. et al; Large Displacement Piezoelectric Actuator Configurations; XP001004521, ASME, New York, New York, NY.

* cited by examiner

CAMERA LENS POSITIONING USING A ELECTRO-ACTIVE DEVICE

The present invention relates to a camera using an electro-active device to position a lens.

Camera lenses need to be moved for focussing and zooming. Otherwise the camera is limited to having a small aperture lens to achieve a sufficient range of focus. Whilst manual adjustment of lens position is possible, it is desirable to provide for electrically-driven adjustment.

To drive camera lenses, it is known to employ an electric-coil motor. However such motors are expensive and only commonly employed on expensive cameras. Also, electric-coil motors are relatively bulky and so their use limits miniaturisation.

Recent developments in CCD and CMOS imaging technology have allowed the development of small, cheap digital cameras. However very few of these cameras have autofocus systems because current, miniature lens-positioning systems are too expensive relative to the cost of the camera.

Piezoelectric motors for positioning camera lenses are known but these are expensive. Other known piezoelectric actuators are unable to provide sufficient displacement in a suitably compact form.

Electro-active materials are materials which deform in response to applied electrical conditions or, vice versa, have electrical properties which change in response to applied deformation. The best known and most developed type of electro-active material is piezoelectric material, but other types of electro-active material include electrostrictive material and piezoresistive material. Many devices which make use of electro-active properties are known.

The most simple type of piezoelectric device is a block of piezoelectric material activated in an expansion-contraction mode by applying an activation voltage in the direction of poling. However, as the piezoelectric effect is small, of the order $10^{-10}$ m/V, the change in dimensions is relatively small, typically less than a micron. Therefore, more complicated electro-active structures have been developed to achieve larger displacements.

A known electro-active structure is the bender construction, for example a bimorph bender construction. With a bender construction, the electro-active structure comprises a plurality of layers at least one of which is of electro-active material. On activation, the layers deform with a differential change in length between the layers for example one layer expanding and another layer contracting. Due to the layers being constrained by being coupled to one another, the differential change in length causes the bender to bend perpendicular to the layers. Accordingly there is a relative displacement of the ends of the structure. However, the relative displacement does not follow a linear path in space. As the structure bends and the degree of curvature increases, the relative displacement of the ends follows a curve in space. As a result of this non-linear displacement, such a device is inconvenient for use in positioning a camera lens.

Furthermore, to achieve relatively large displacement, it is necessary to increase the length of the structure which therefore becomes inconvenient. For example, to achieve a displacement of the order of 0.1 mm with a bimorph bender construction, a structure of length around 5 cm is typically needed. Thus such a device is not sufficiently compact for use in camera lens positioning.

According to the present invention, there is provided a camera having a movable lens coupled for positioning of the lens to an electro-active device comprising an electro-active structure extending along a curved minor axis and arranged, on activation, for the structure to twist around the minor axis and concomitantly for relative displacement of the ends of the structure to occur, the ends of the structure being coupled to position the lens.

First, activation of the electro-active device will be considered. The relative displacement between the ends of the device occurs concomitantly with the twist of the structure around the minor axis on activation, because of the fact that the device extends along a curved minor axis. The electro-active device uses the physical principal that twisting of a curved object causes displacement perpendicular to the local curve, and vice versa displacement of the ends of a curved object causes twisting along its length. The displacement is equivalent to a change in the orientation of the minor axis of the structure relative to its original orientation.

The device uses an electro-active structure which twists on activation. Considering any given small section of the structure along the curved minor axis it is easy to visualise how twist of that given section rotates adjacent sections and hence relatively displaces them in opposite directions perpendicular to the local curve of the given section, because the adjacent sections extend at an angle to the given section as a result of the curve of the minor axis. Therefore twisting of the given section is concomitant with a relative displacement of the adjacent sections perpendicular to the plane of the curve. The degree of relative displacement is proportional to the degree of curvature in the given section and the magnitude of the twisting. The overall displacement of the device is the combination of the displacement of each section. Thus the overall displacement on activation is a relative displacement of the ends of the structure.

For minor axes which extend along a regular curve around a major axis, such as along an arc of a circle or a helix, on activation each section produces displacement in the same direction parallel to the major axis. Therefore, the overall relative displacement of the end of the structure is a linear displacement parallel to the major axis. Therefore an electro-active device in accordance to the present invention can produce displacement which is linear in space, making it suitable for positioning of a camera lens.

The degree of displacement is proportional to the length of the structure along the minor axis, because each section of the structure contributes to the overall displacement. Therefore any desired degree of displacement may be achieved by suitable design of the device, in particular by selection of the length of the structure along the minor axis and of the type of structure which controls the magnitude of the twisting-field response. As a result of the structure extending along a minor axis which is curved, a relatively compact device may be produced. In general, the curve along which the minor axis extends may be of any shape which provides linear displacement.

One possibility is for the curve along which the minor axis extends to be planar, for example as the arc of a circle or a spiral. In this case, the displacement on activation occurs perpendicular to the plane of the curve. The thickness of the device in the direction in which relative displacement occurs is merely the thickness of the electro-active structure so a relatively thin device may be produced.

Another possibility is for the curve along which the minor axis extends to be a helix. In this case, each helical tun of the structure contributes towards displacement in the direction along the geometrical major axis around which the helix is formed. Therefore a large degree of displacement may be achieved proportional to the number of helical turns, therefore producing relatively high displacement for a relatively compact device.

The electro-active device is by its nature relatively compact. This means it is easily employed in a camera so that the displacement of the ends of the structure drives positioning of the lens. Typically the camera comprises a housing relative to which the lens is moveable and the ends of the electro-active structure are coupled to the lens and the housing, respectively.

In one particularly convenient arrangement, the electro-active structure is curved around the optical axis of the lens. This provides a particularly compact arrangement, because it limits the extent to which the structure of the electro-active device extends away from the optical axis of the lens. Instead, the curve along which the minor axis of the structure extends, which curve is intrinsic for proper operation of the device, can be fitted conveniently around the outside of the lens without adding significant bulk to the camera as a whole.

Use of the electro-active device described above, therefore, can drive positioning of the lens linearly with a relatively compact arrangement. Furthermore, the electro-devices can be produced relatively cheaply compared to other lens positioning systems such as those based on electro-magnet coil motors, and particularly when compared to known miniature lens-positioning systems. In addition the electro-active device of the present invention inherently provides a relatively high resolution of positional control, the main limiting factor being the resolution of the applied activation voltage.

The present invention may be applied to lenses which are moveable for focussing of the camera or for zooming, typically as part of a larger lens arrangement. The present invention is typically applicable to a camera having an electrical image sensor onto which the lens directs light for production of a digital image, such a charge coupled device (CCD) or a CMOS sensor. In this case, the advantages achieved by the use of the electro-active device compliment the advantages achieved by the use of the electrical image sensor. The output of the image sensor may be used to control the positioning of the lens. However, the present invention is equally applicable to a camera which exposes an image on photographic film.

Preferably, the electro-active structure of the electro-active device comprises electro-active portions disposed successively along the minor axis and arranged to bend, on activation, around the minor axis.

The electro-active structure is arranged with portions which bend on activation around the minor axis concomitantly with twisting of the structure around the minor axis. As a result, the electro-active portion may have any construction which bends on activation. The preferred construction is the known bender construction comprising a plurality of layers including at least one layer of electro-active material, preferably a bimorph bender construction having two layers. Such a construction is well known and understood as applied to a straight bender and particularly easy to manufacture. The same benefits are obtained when the bender construction is applied to the portions of the present invention. However, any other construction which provides bending on activation may be used.

Preferably, the electro-active structure comprises a continuous electro-active member curving around the minor axis, said electro-active portions being adjacent finite portions of the continuous member.

This structure is particularly easy to manufacture, for example by winding a deformable continuous electro-active member into shape.

Preferably wherein the continuous electro-active member curves in a helix around the minor axis.

By using a continuous electro-active member which curves in a helix around the minor axis a number of advantages are achieved. Firstly, it is easy to provide a structure which is regular along the length of the minor axis and hence provide the same degree of twisting along the entire length of the minor axis. Secondly, the helix is easy to manufacture, for example by winding a deformable continuous member into shape or by making a helical cut in a tubular electro-active member. Thirdly, the device is compact as the helical turns of the member around the minor axis may be packed closely together.

However the electro-active structure may alternatively comprise a continuous electro-active member having a different shape which provides for bending around the minor axis concomitantly with twisting around the minor axis. For example it may comprise a continuous member having the shape of a flat member twisted around the minor axis. Furthermore, instead of comprising a continuous electro-active member, the electro-active structure may comprise a plurality of electro-active portions coupled together.

To allow better understanding, embodiments of the present invention will now be described by way of non-limitative examples with reference to the accompanying drawings in which.

According to the present invention, a camera having a moveable lens is provided with an electro-active device for positioning of the lens. For clarity, the electro-active device will first be described, followed by the camera as a whole.

In the following description, the electro-active devices are described with reference to minor and major axes which are imaginary, but are nonetheless useful for visualising and defining the devices.

Figure 1:
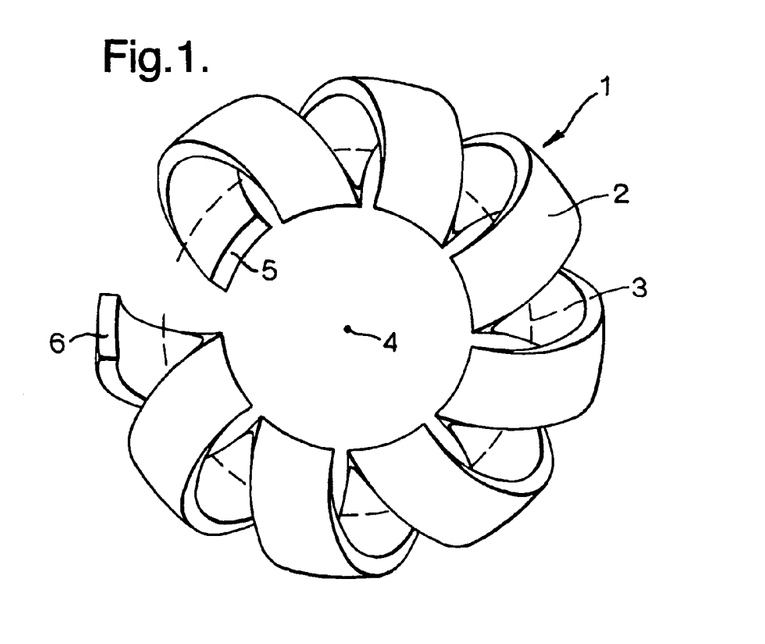
FIG. 1 is a plan view of a first electro-active device.

A first electro-active device 1 in accordance with the present invention is illustrated in FIG. 1. The device 1 comprises a structure consisting of a continuous electro-active member 2 curving in a helix around a minor axis 3 so that the structure extends along the minor axis 3. The minor axis 3 is curved, extending in a curve which is an arc of a circle around a geometrical major axis 4 perpendicular to the plane of the minor axis 3, i.e out of the plane of the paper in FIG. 1. As the minor curve 3 is planar, the thickness of the device parallel to the major axis 4 is merely the thickness of the helical structure of the electro-active member 2.

Figure 2:
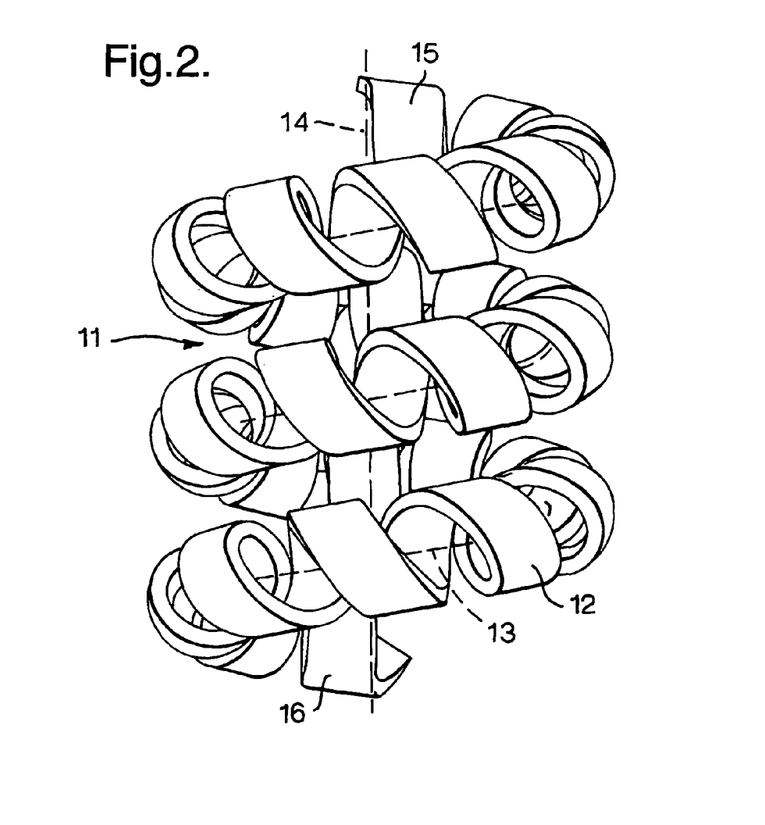
FIG. 2 is a side view of a second electro-active device.

A second electro-active device 11 in accordance with the present invention is illustrated in FIG. 2. The device 2 comprises a structure consisting of a continuous electro-active member 12 to curving in a helix around a minor axis 13 so that the structure extends along the minor axis 13. The minor axis 13 is curved, extending in a curve which is a helix around a geometrical major axis 14. The electro-active device 11 is illustrated in FIG. 2 with a minor axis which extends along of a helix of three turns merely for illustration, any number of turns being possible.

Figure 3:
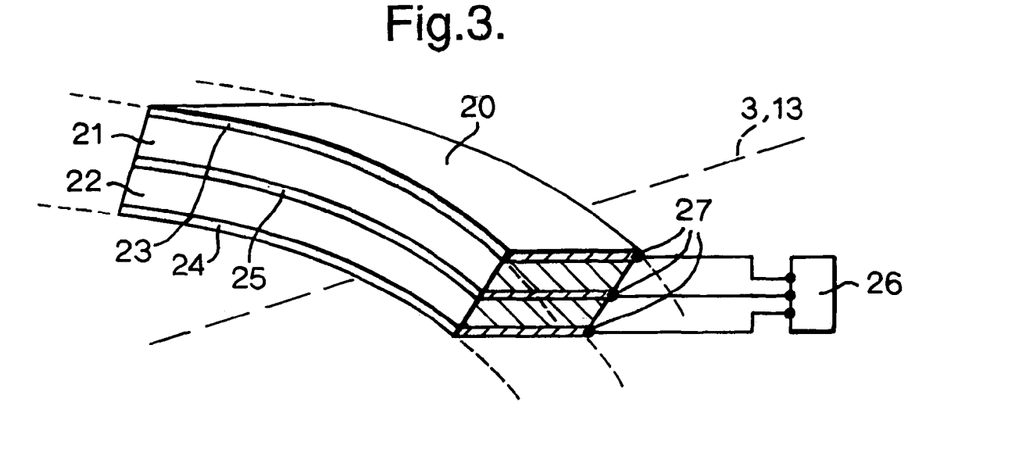
FIG. 3 is a perspective view of a portion of either the first device of FIG. 1 or the second device of FIG. 2.

FIG. 3 illustrates a portion 20 of either the continuous member 2 of the first device 1 of FIG. 1 or the continuous member 12 of the second device 11 of FIG. 2. The construction of the portion 20 being the same for both the first device 1 and the second device 2 the electro-active portion 20 is a finite portion of the continuous member 2 or 12 and hence the electro-active member 2 or 12 may be considered as a plurality of adjacent portions 20 as illustrated in FIG. 3 disposed successively along the minor axis 3 or 13. Hence, the portion 20 extends along part of a helical curve around the minor axis 3 or 13 as shown in FIG. 3.

FIG. 3 illustrates the construction of the electro-active portion 20. This construction is preferably uniform along the entire length of the minor axis 3 or 13 in order to provide uniform properties on activation. Alternatively, the device 1 or 11 may be designed with some variation along the length of the minor axis 3 or 13, either in the construction of the continuous member 2 or 20 or in the shape of the curve of the continuous member 2 or 20 around the minor axis 3 or 13.

The electro-active portion 20 has a bimorph bender construction comprising two layers 21, 22 of electro-active material extending along the length of the portion 20. The layers 21, 22 of electro-active material both face the minor axis 3 or 13. The electro-active layers 21 or 22 preferably extend, across the width of the portion 20, parallel to the minor axis 3 or 13, although there may be some distortion of the electro-active portion 20 of the continuous member 2 or 12 due to the nature of the curve around the minor axis 3 or 13. Alternatively, the layers 21 or 22 may extend, across the width of the portion 20, at an angle to the minor axis 3 or 13 so that one edge along the electro-active portion 20 is closer to the minor axis 3 or 13 than the opposite edge.

The material of the electro-active layers 21 or 22 is preferably piezoelectric material. The piezoelectric material may be any suitable material, for example a piezoelectric ceramic such as lead zirconate titanate (PZT) or a piezoelectric polymer such as polyvinylidenefluoride (PVDF). However, the material of the electro-active layers 21, 22 may be any other type of electro-active material, for example piezoresistive material, in which the electrical resistance changes as the material is deformed or strained, or electrostrictive material, which constricts on application of an electric field.

The electro-active portion 20 further comprises electrodes 23 to 25 extending parallel to the layers 21, 22 of piezoelectric material. Outer electrodes 23, 24 are provided outside the electro-active layers 21, 22 on opposite sides of the electric-active portion 20. A centre electrode 25 is provided between the electro-active layers 21 and 22. The electrodes 23 to 25 are used to apply poling voltages and to operate electro-active portion 20 in a bending mode. On electrical activation, activation voltages are applied to the electrodes 23 to 25. On activation, the electro-active layers 21 and 22 undergo a differential change in length concomitant with bending of the portion 20 due to the constraint of the layers being coupled together at their interface formed by the centre electrode 25. For maximum displacement, on activation one of the electro-active layers 21 or 22 expands and the other one of the electro-active layers 21 and 22 contracts. The relative direction and magnitude of the activation and poling voltages may be selected in the same manner as for known linear electro-active devices having a bender construction. For example, poling voltages of sufficient magnitude to pole the electro-active layers 21 and 22 may be applied in opposite directions across the electro-active layers 21 and 22 by grounding the centre electrode 25 and applying poling voltages of the same polarity to both the outer electrodes 23, 24. In this case, the electro-active portion 20 is electrically activated by applying activation voltages in the same direction across the electro-active layers 21 and 22 by applying voltages of opposite polarity to the two outer electrodes 23 and 24.

On activation the electro-active portion 20 bends around the minor axis 3 or 13, either towards or away from the minor axis 3, 13 depending on the polarity of the activation voltages. On electrical activation the activation voltages are applied from a circuit 26 through external terminals 27 electrically connected to the electrodes 23 to 25 in the manner known for known straight piezoelectric devices having a bender construction.

Electrical connection to the electrodes 23 to 25 may be made in the same way as is known for known straight devices having a bender construction, in principle at any point along the length of the device of which the portion 20 forms part but preferably at the end. The preferred technique is to provide the electrodes with fingers (not shown) extending at the end of the device at different lateral positions across the width of the device as known for straight devices having a bender construction.

It will be appreciated that other bender constructions could equally be applied to the portion 20, for example a unimorph bender construction comprising a layer of electro-active material and an inactive layer or a multimorph bender construction comprising a plurality of layers of electro-active material.

Whilst the bender construction illustrated in FIG. 3 is preferred for simplicity and ease of manufacture, it will be appreciated that the continuous numbers 2 or 12 could in fact have any construction which bends around the minor axis 3 or 13 on activation. For example, the continuous members could be electro-active elements of the type described in the application being filed simultaneously with this application entitled "Electro-Active Elements and Devices" in which the elements have two pairs of electrodes extending along the length of the member for bending across the width on activation.

On activation, the electro-active portions 20 of the continuous member 2 or 12 bend around the minor axis 3 or 13. As a result of the continuous electro-active member 2 or 12 curving around the minor axis 3 or 13, in particular in a helix, such bending is concomitant with twisting of the continuous member 2 or 12 around the minor axis 3 or 13. This may be visualised as the turns of the continuous member 2 or 12 as the bending tightening or loosening causing a twist of the structure of the member 2 or 12 along the minor axis 3 or 13. The twist of the continuous member 2 or 12 occurs along the entire length of the minor axis 3 or 13 causing a relative rotation of the ends of the structure labelled 5 and 6 in the first device 1 of FIGS. 1 and 15 and 16 in the second device 11 of FIG. 2.

It will be appreciated that the continuous member 2 or 12 could curve around the minor axis 3 or 13 in curves other than a helix to produce such twisting, for example by having the shape as though formed by twisting a flat member round the minor axis. It will also be appreciated that other structures other than a continuous member could be applied to produce twisting around the minor axis. For example the electro-active structure could consist of a plurality of electro-active portion disposed successively along the minor axis and coupled together so that the bending of each individual portion twists the adjacent portion around the minor axis causing twisting of the structure as a whole. Alternatively the electro-active structure could be a device of the type described in the application being filed simultaneously with this application entitled "Piezoelectric Devices" which comprises a plurality of electro-active torsional actuators which may comprise electro-active elements activated in shear mode.

Considering the first device 1 of FIG. 1, the twisting of the continuous member 2 around the minor axis 3 is concomitant with relative displacement of the ends of the device 5 and 6 perpendicular to the curve of the minor axis 3, that is parallel to the major axis 4. The relative displacement of the ends 5 and 6 derives from the twisting of the continuous member 2 around the minor axis 3 in combination with the curve of the minor axis 3. It is an inevitable result that twisting of a curved object causes relative displacement of the ends of that object perpendicular to the local curve of the object.

In a similar manner, on activation of the second device of FIG. 2, the twisting of the continuous member 12 around the minor axis 13 is concomitant with displacement of the ends of the device 15 and 16 parallel to the major axis 14. Again, this relative displacement derives from the rotation of the continuous member 12 around the minor axis 13 in combination with the curve of the minor axis 13. In this case, the relative displacement caused by any given small section of the structure along the minor axis 13 causes relative displacement of the ends of that section perpendicular to the local curve of the minor axis 13. The overall displacement of the ends 15, 16 of the device 11 is the sum of the displacements of all the sections which results in an overall relative displacement parallel to the major axis 14.

The exact construction and dimensions of the member 2 or 12 and the form of the electro-active structure may be freely varied to produce the desired response. A suitable member 2 or 12 has a 0.5 mm thickness tape wound as a 4 mm diameter minor helix around the minor axis 3 or 13. When this forms the first device 1 in which the minor curve extends around about three quarters of a circle of 30 mm diameter the observed displacement is about ±6 mm. Similarly if this structure was used to form the second device 11 in which the minor curve extends along a 20 turn helix of diameter 30 mm, this would produce displacement of around ±120 mm.

In general, the minor axis, along which the structure of devices in accordance with the present invention extend, may follow any curve and the resultant displacement of the ends of the structure will be the sum of the displacement caused by each section of the structure along the curve. However, curves which are regular such as the curve of the minor axis of the first and second devices 1 and 11 are preferred so that all sections of the device caused relative displacement in a common direction and also because design and manufacture are thereby simplified.

In accordance with the present invention the first and second devices 1 and 11 are electrically activated to create mechanical displacement between the ends 5 and 6 or 15 and 16, although the devices 1 and 11 are capable of being mechanically activated in which case relative displacement of the ends 5 and 6 or 15 and 16 causes an electrical voltage to be developed across the electrodes 23 to 25.

Manufacture of the electro-active devices 1 and 11 will now be described.

The preferred method of manufacture is to initially form the electro-active structure extending along a straight minor axis and subsequently to bend the straight electro-active structure so that the minor axis along which it extends becomes curved.

To form the continuous member 2 or 12 as an electro-active structure along a straight minor axis there are two preferred techniques.

The first preferred technique is to initially form the continuous member 2 or 12 as a straight member and subsequently to deform it to curve around the straight minor axis. The bender construction of the continuous member 2 or 12 is in itself known and the continuous member 2 or 12 may be formed by applying any of the known techniques for manufacturing a device having a bender construction. For example, the continuous member 12 may be initially manufactured by co-extrusion of the layers 21 and 22 of plasticised material or by co-calendering of the layers 21 and 22. Alternatively, the continuous member 2 or 12 may be made through lamination of thin layers 21 and 22. These thinner layers may be made by any suitable route, such as high shear mixing of a ceramic powder, polymer and solvent mixer followed by co-extrusion and calendering. Alternatively, techniques such as tape casting or the process known as the Solutech process known in the field of ceramics may be used.

The electrodes may be formed as an integral part of the manufacture of the continuous member 2 or 12, for example by being in co-extruded or co-calendered. Further electrodes, which may be activation layers 23 to 25 or may be terminal electrodes to allow access to the electrodes 23 to 25, may be applied by printing, by electro-less plating, through fired-on silver past or by any other appropriate technique.

The second preferred technique is to initially manufacture the continuous member as a cylinder or other tube with a multi-layered bender construction of electro-active layers 21 and 22 and electrodes 23 to 25 and subsequently to cut the member along the helical line to leave the continuous member 2 or 12 extending in a helix around the axis of the cylinder or tube which then constitutes the minor axis.

Subsequently the straight structure is bent to curve the minor axis along which the structure extends.

To deform the member and structure, there must exist in the initially formed member a sufficient degree of flexibility. Suitably deformable electro-active materials are known, typically including constituent polymers which enhance the deformability. With such materials after shaping, the constituent polymers are burnt out, typically at up to 600° C. and the material is then densified through further sintering at higher temperature, typically 1000° C. to 1200° C. In this case, the electro-active structure is initially formed with enlarged dimensions to allow for linear shrinkage which occurs during sintering, typically of around 12 to 25%.

The curving of the straight member and the bending of the structure may be performed around formers. The formers are subsequently removed either physically or by destruction of the former for example by melting, burning or dissolving.

Cameras using the electro-active devices of the type described above will now be described. The electro-active devices are described and illustrated as having the same structure as the first device 1 described above extending around an arc of a circle, but this is merely for illustration as the electro-active devices may have any of the types of structure described above. However, it is preferable to use an electro-active device in which the curved minor axis along which the structure of the device extends is planar, such as the first electro-active device 1, from the point of view of reducing the thickness of the camera 30.

Figure 4:
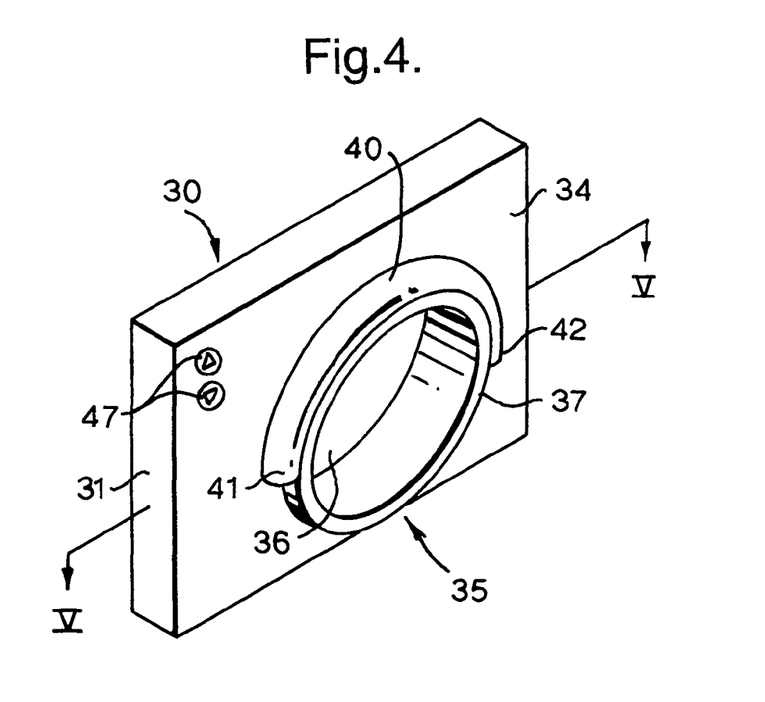
FIG. 4 is a perspective view of a first camera in accordance with the present invention.
Figure 5:
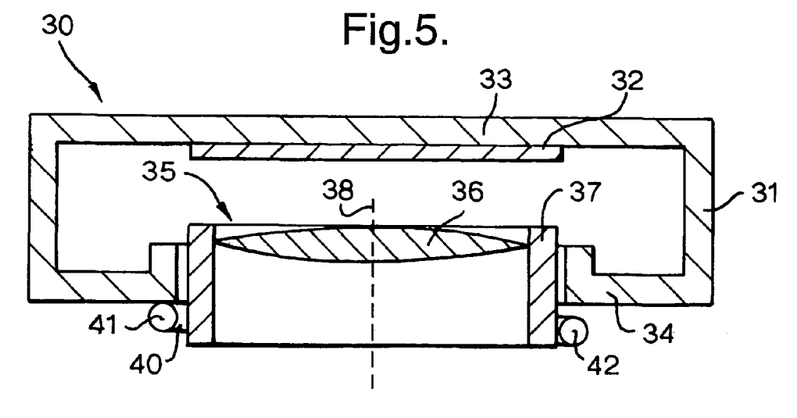
FIG. 5 is cross-sectional view of the first camera taken along the line V—V in FIG. 4.

A first camera 30 in accordance with the present invention is illustrated in FIGS. 4 and 5. The camera 30 comprises a housing 31 having an electrical image sensor 32 mounted to the rear face 33 of the housing 31 inside the housing 31. The image sensor 32 may be any type of image sensor, such as a charge coupled device (CCD) or a CMOS sensor.

In the front face 34 of the housing 31, there is mounted a lens unit 35 which comprises a lens 36 fixed inside a cylindrical carrier 37. The lens 36 directs light along its optical axis 38 to form an image on the image sensor 32. The carrier 37 is slidably mounted in the front face 34 of the housing 31 to allow movement of the lens 36 parallel to its optical axis 38. Such movement of the lens 36 allows it to be positioned to focus the image formed by the lens 36 on the image sensor 32.

Figure 6:
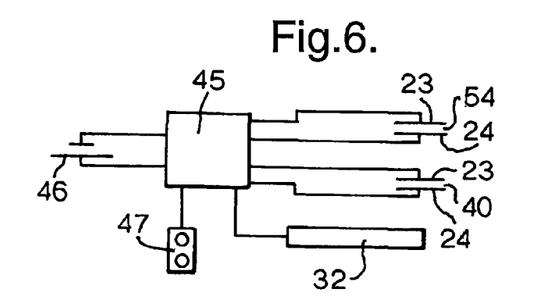
FIG. 6 is a diagram of the electrical circuits in the first camera and in a second camera.

To drive movement of the lens 36, an electro-active device 40 of the type described above is coupled in between the housing 31 and the lens 36. The electro-active device 40 is arranged so that the minor axis along which the structure of the electro-active device 40 extends is curved around the optical axis 38 of the lens 36, preferably lying in a plane which is perpendicular to the optical axis 38. As a result, on activation, the ends 41 and 42 of the device 40 are relatively displaced parallel to the optical axis 38. One end 41 of the electro-active device 40 is coupled to the housing 31, whereas the other end 42 is coupled to the carrier 37 of the lens unit 35, and hence is indirectly coupled to the lens 36. Accordingly, activation of the electro-active device 40 drives movement of the lens 36 parallel to its optical axis 38 to adjust the focussing of the camera The circuitry of the first camera 30 is illustrated in FIG. 6. The circuitry includes a control circuit 45 powered by a battery 46. The control circuit 45 receives and processes the output of the image sensor 32. The control circuit 45 also controls the operation of the camera 30 in a conventional manner and may have any suitable form for this purpose, typically being a microprocessor. In addition to these functions, the control circuit 45 is connected to the electrodes 23, 24 of the electro-active device 40 and supplies activation voltages to activate it. The magnitude of the applied activation voltages controls the magnitude of displacement of the ends 41 and 42 of the device 40, hence controlling the position of the lens 36 along the optical axis 38 and the focussing of the camera 30.

The control circuit 45 may control the position of the lens 36 in response to manually operated buttons 47 provided on the housing 31 of the camera 30, to allow a user to indicate the desired degree of focus. Alternatively, the control circuit 45 may control the position of the lens 36 in response to the output of the image sensor 32. In this case the control circuit 45 detects the degree of focus from the output image signal and controls the position of the lens to automatically focus the image. To do this, the control circuit 45 uses any of the known auto-focus algorithms, for example by maximizing the contrast in the image output from the image sensor 32.

Figure 7:
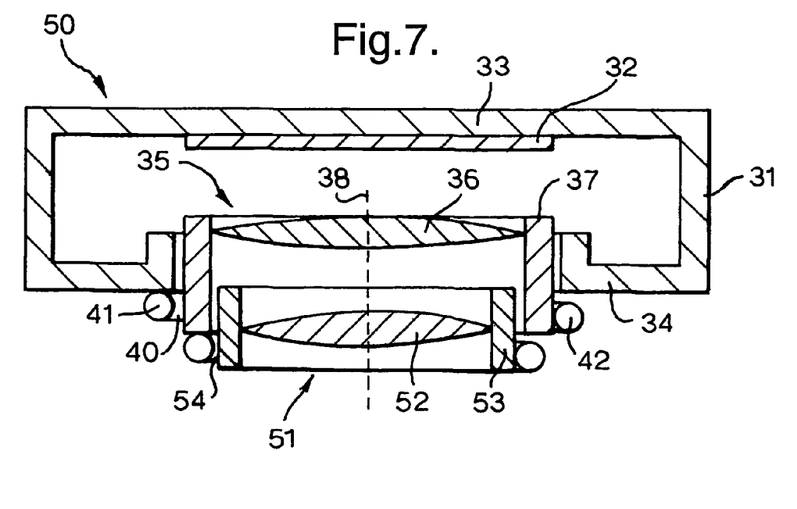
FIG. 7 is a cross-sectional view of the second camera in accordance with the present invention.

A second camera in accordance with the present invention is illustrated in FIG. 7. Except for the differences described below, the second camera 50 is identical to the first camera 30 and so for the common elements the same reference numerals will be used and a description thereof will not be repeated.

The second camera 50 differs from the first camera 30 by having a compound lens system. In particular the second camera 50 is additionally provided with a second lens unit 51 comprising a second lens 52 fixed inside a second carrier 53 which is slidably mounted inside the first mentioned carrier 37 of the first mentioned lens unit 35. Thus the second lens 52 is moveable coaxially with the first lens 36 along the optical axis 38. The relative position of the second lens 52 with respect to the first lens 36 alters the magnification of the lens system formed by the two lenses 36 and 52 together, thereby controlling zooming. To drive such movement of the second lens 52 with respect to the first lens 36, a second electro-active device 54 of the type described above is coupled between the first and second lens units 35 and 51, hence being indirectly coupled to the first and second lenses 36 and 52. Activation of the second electro-active device 54 therefore controls the position of the second lens 52 with respect to the first lens 36 and hence controls zooming of the camera 50.

The electrical circuit illustrated in FIG. 6 is also used in the second camera 50. In the same way as the first camera 30, the control circuit 45 applies activation voltages to the electrodes 23, 24 of the second electro-active device 54, either in response to manual control effected by the user or by using optical feedback responsive to the output from the image sensor 32.

In general, an electro-active element of the type described above may move any lens of a camera, whether it is the sole lens as in the first camera 30 or a lens of the compound lens system as in the second camera 50. The element may move the lens relative to the housing of the camera or relative to the other lenses of a compound lens system, or both.

The invention claimed is:

1. A camera having a movable lens coupled for positioning of the lens to an electro-active device comprising an electro-active structure extending along a curved minor axis and arranged, on activation, for the structure to twist around the minor axis and concomitantly for relative displacement of the ends of the structure to occur, the ends of the structure being coupled to position the lens.

2. A camera according to claim 1, wherein the electro-active structure comprises electro-active portions disposed successively along the minor axis and arranged to bend, on activation, around the minor axis.

3. A camera as claimed in claim 2, wherein the electro-active structure comprises a continuous electro-active member curving around the minor axis, said electro-active portions being adjacent finite portions of the continuous member.

4. A camera as claimed in claim 3, wherein the continuous electro-active member curves in a helix around the minor axis.

5. A camera as claimed in any one of claims 2 to 4, wherein the successive electro-active portions have a bender construction of a plurality of layers including at least one layer of electro-active material.

6. A camera as claimed in claim 5, wherein the electro-active portions have a bimorph bender construction of two layers of electro-active material or a multimorph bender construction of more than two layers of electro-active material.

7. A camera as claimed in any one of the preceding claims, wherein the electro-active structure includes electrodes for application of an electric field to activate the electro-active structure.

8. A camera as claimed in any one of the preceding claims, wherein the minor axis extends in curve which is a helix.

9. A camera as claimed in any one of the preceding claims, wherein the minor axis extends in a curve which is planar.

10. A camera as claimed in any one of the preceding claims, wherein the electro-active structure includes piezoelectric material.

11. A camera as claimed in claim 10, wherein the piezoelectric material is a piezoelectric ceramic or a piezoelectric polymer.

12. A camera as claimed in claim 11, wherein the piezoelectric material is lead zirconate titanate (PZT) or polyvinylidenefluoride (PVDF).

13. A camera as claimed in any one of the preceding claims, wherein the camera comprises a housing relative to which the lens is movable, the ends of the electro-active structure being coupled to the lens and the housing, respectively.

14. A camera as claimed in any one of the preceding claims, wherein the lens is movable for focussing of the camera.

15. A camera as claimed in any one of the preceding claims, wherein the lens is movable for zooming.

16. A camera as claimed in any one of the preceding claims, wherein the lens is part of a compound lens system.

17. A camera as claimed in any one of the preceding claims, further comprising a control circuit for activating the electro-active device to position the lens.

18. A camera as claimed in any one of the preceding claims, wherein the camera further comprises an electrical image sensor onto which the lens directs light.

19. A camera as claimed in claim 18 when appendant to claim 17, wherein the control circuit is responsive to the output of the image sensor to control the positioning of the lens.

20. A camera as claimed in any one of the preceding claims, wherein the electro-active structure extends along a minor axis which is curved around the optical axis of the lens.

* * * * *